US006763253B1

(12) United States Patent
Niehoff et al.

(10) Patent No.: US 6,763,253 B1
(45) Date of Patent: Jul. 13, 2004

(54) DEVICE FOR BI-DIRECTIONAL TRANSMISSION OF AUDIO AND/OR VIDEO SIGNALS

(75) Inventors: Wolfgang Niehoff, Wedemark (DE); Axel Haupt, Langenhagen (DE)

(73) Assignee: Sennheiser Electronics GmbH & Co. KG (DE)

( * ) Notice: Subject to any disclaimer, the term of this patent is extended or adjusted under 35 U.S.C. 154(b) by 469 days.

(21) Appl. No.: 09/698,508

(22) Filed: Oct. 26, 2000

(30) Foreign Application Priority Data

Oct. 28, 1999 (DE) ........................................ 199 52 061
Apr. 27, 2000 (DE) ........................................ 100 20 751

(51) Int. Cl.[7] ................................................ H04Q 7/32

(52) U.S. Cl. ............................... 455/575.1; 455/550.1; 455/73; 455/84; 455/517; 381/107; 381/104; 381/106

(58) Field of Search .......................... 455/575.8, 575.1, 455/575.6, 90.2, 90.3, 550.1, 557, 422.1, 517, 500, 563, 445, 73, 3.06, 403, 426.1, 84, 88; 381/107, 104, 106

(56) References Cited

U.S. PATENT DOCUMENTS 4,225,970 A * 9/1980 Jaramillo et al. ........ 455/575.8

(List continued on next page.)

FOREIGN PATENT DOCUMENTS

| | | |
|---|---|---|
| GB | 2303017 | 2/1997 |
| WO | WO 97/26744 | 7/1997 |

OTHER PUBLICATIONS

Haruhiko Mizuno, Hideo Mitsumoto, Hisao Nakakita, and Norihiko Yazawa, "A Small 42–GHz Transmitter and Receiver for a Wireless HDTV (Hi–Vision) Camera," Electronics and Communications In Japan, Part 1, vol. 77, No. 3, 1994.

*Primary Examiner*—William Trost
*Assistant Examiner*—Keith Ferguson
(74) *Attorney, Agent, or Firm*—Altera Law Group LLC

(57) ABSTRACT

Proposed by the invention is a device for the bidirectional transfer of audio and/or video signals, in particular in the context of sound and/or image reports, with:

Figure 1:
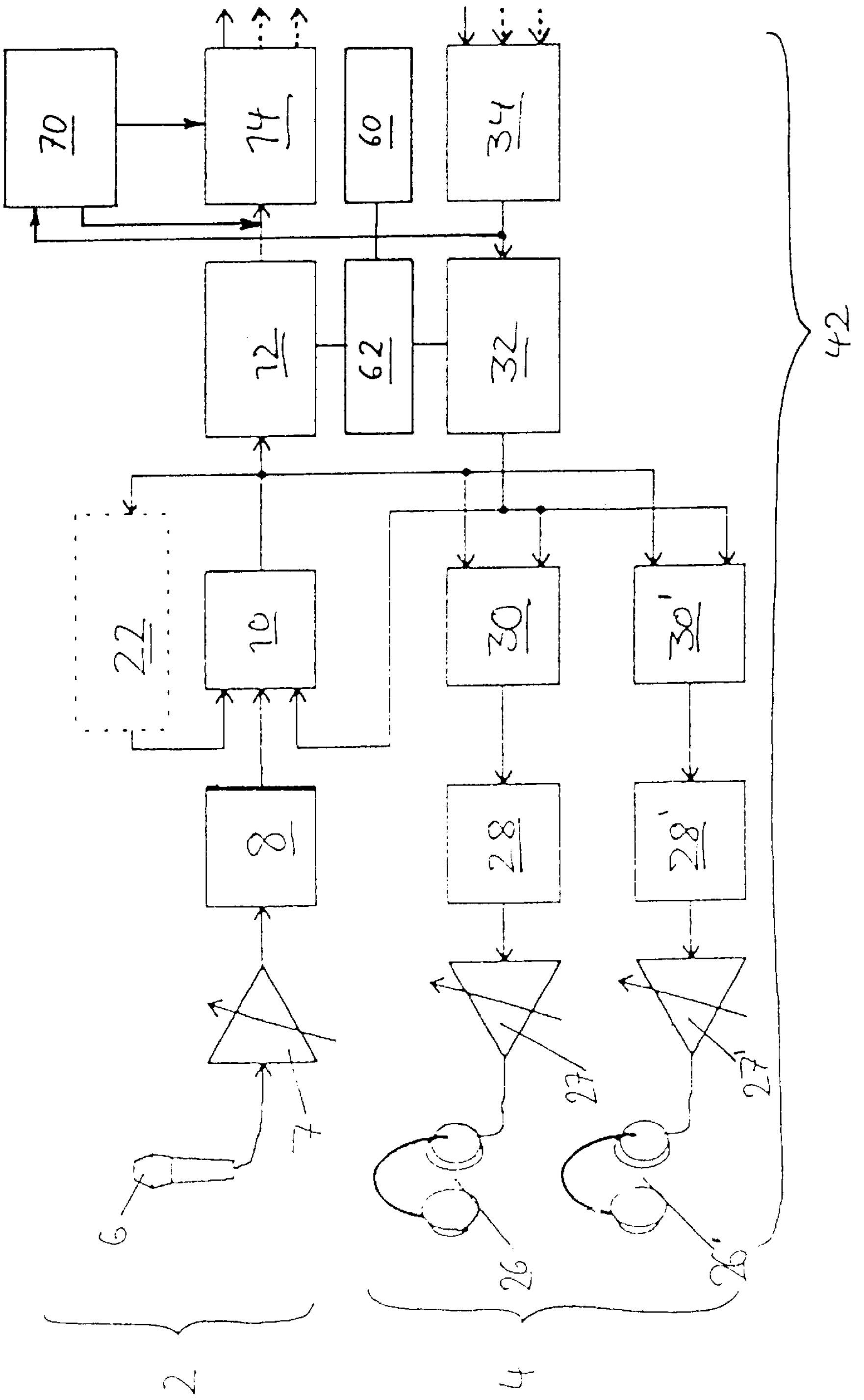

at least one means (6) for providing an audio input signal;

a first mixing device (10), which is connected to the means (6) for providing the audio input signal and which is designed to output a mixed audio transmission signal;

a transmission and/or reception device coupled to the first mixing device (10) for transmitting the mixed audio transmission signal and/or receiving an audio reception signal;

a control device (22) coupled to the first mixing device (10) for controlling the first mixing device (10);

a compression and/or decompression device (12, 32) for compression of the mixed audio transmission signal or, as the case may be, for decompression of the audio reception signal, which compression and/or decompression device is connected to the first mixing device (10) for taking up the mixed audio transmission signal or, as the case may be, to at least the second mixing device (30) for delivering a decompressed audio reception signal, and connected to the transmission and/or reception device for delivering a compressed audio transmission signal or, as the case may be, for taking up the audio reception signal; and at least one means (26), connected to the second mixing device (30), for reproducing an audio output signal, which in particular contains the decompressed audio reception signal;

in which device provision is made for at least one mobile-radio and/or mobile-telephone-network channel as a transfer channel.

22 Claims, 5 Drawing Sheets

U.S. PATENT DOCUMENTS

| | | | | | |
|---|---|---|---|---|---|
| 4,677,656 | A | * | 6/1987 | Burke et al. | 455/557 |
| 5,790,958 | A | * | 8/1998 | McCoy et al. | 455/557 |
| 5,913,189 | A | * | 6/1999 | Lee et al. | 455/563 |
| 6,246,885 | B1 | * | 6/2001 | Black et al. | 455/550.1 |
| 6,404,891 | B1 | * | 6/2002 | Seitz et al. | 381/107 |
| 6,446,037 | B1 | * | 9/2002 | Fielder et al. | 381/104 |

* cited by examiner

DEVICE FOR BI-DIRECTIONAL TRANSMISSION OF AUDIO AND/OR VIDEO SIGNALS

The invention concerns a device for bidirectional transferring of audio and/or video signals, in particular in the context of sound and/or image reports.

Devices of the above-mentioned type are known. One known device displays means for providing an audio input signal. The means is connected to a transmission and/or reception device for transmitting the audio signal and/or receiving a audio reception signal. In the known device the transmission and/or reception equipment is designed as ISDN equipment. The application possibilities of the known device are limited to the extent that the operator is dependent on the presence of an ISDN line in the fixed network. If need be, the report to be transferred must be intermediately stored on a storage medium. The storage medium, with the report stored on it, is brought to a device that is connected to an ISDN line. The report is transferred from the storage medium to the device and transmitted via the ISDN line.

In another known device, the transmission and/or reception equipment is designed as a device for connection to a GSM telephone. The connection to the GSM telephone is complicated. In order to transmit with high sound quality, the report must first be intermediately stored on a storage medium. This is due to the fact that when transferring the report via a GSM telephone the transfer rate is low and thus the transferring of the report can be of longer duration than the report itself.

The object forming the basis of the invention is to further develop the known device for bidirectional transferring of audio and/or video signals in such a way that the application possibilities are greatly expanded relative to the prior art.

This object is achieved through a device for bidirectional transferring of audio and/or video signals, in particular in the context of sound and/or image reports, preferably for a real-time transfer, with the following features:

at least one means for providing an audio input signal a first mixing device that is connected to the means for providing an audio input signal and is intended for output of a mixed audio transmission signal a transmission and/or reception device coupled to the first mixing device for transmitting the mixed audio transmission signal and/or receiving an audio reception signal a control device coupled to the first mixing device for controlling the first mixing device a second mixing device (30)

a compression and/or decompression device for compressing the mixed audio transmission signal or decompression of the audio reception signal, which device is coupled to the first mixing device for taking up the mixed audio transmission signal or, as the case may be, to at least one second mixing device for delivery of a decompressed audio reception signal, and to the transmission and/or reception device for delivery of a compressed audio transmission signal or, as the case may be, for taking up the audio reception signal at least one means connected to the second mixing device for reproducing an audio output signal, which in particular presents the decompressed audio reception signal in this device, as a transfer channel provision is made for at least one mobile radio and/or mobile telephone network channel With the invention, one obtains a device for bidirectional transferring of audio and/or video signals, which device's application possibilities, in particular in the context of sound and/or image reports, are quite manifold. The device according to the invention is especially simple to operate. Through the mobile radio or mobile telephone channel, the transfer can take place independently of a fixed network. Thus, the device makes possible an application that is to a great degree untied to location. By means of the device, the report can be transferred in real time at a high level of quality. Beyond this, the device makes possible, during the reproduction of the report, an interactive inclusion of the receiver of the report.

The transmission and/or reception device is intended for—preferably independent—transmitting and/or receiving of the compressed audio transmission signal or audio reception signal on several transfer channels, which preferably have the same importance. If necessary, by means of the device video signals and/or other signals relevant to a report can also be transferred, transmitted, and/or received. An advantage of this form of embodiment of the invention is the fact that a rate of transfer that amounts to many times that of a single transfer channel becomes possible. In the case of a form of embodiment that is to be preferred, according to which the transfer can take place on the transfer channels independently of each other, an especially high degree of stability of the transfer is ensured, even if, during the transfer, a (temporary) loss of one or more of the transfer channels should occur. Depending on the compressed audio transmission signal to be transmitted and the audio reception signal to be received, the number and/or type of the transfer channels intended for the transfer differ from the number and/or type of the transfer channels intended for the reception. In this form of embodiment, by means of an adapting of the number and/or type of the transfer channels to the present requirements, the transfer channels are optimally used to capacity, in particular in order to make possible a transfer in real time while using the lowest possible number of transfer channels.

Preferably, the device displays a first channel-control device for selecting one or several transfer channels. If need be, the first channel-control device puts the data of the compressed audio transmission signal into packets. The first channel-control device then distributes the data packets over the transfer channels. The first channel-control device is placed between the compression device and the transmission device. In this form of embodiment of the invention, the first channel-control device ensures an especially simple transfer, even when the data of the audio signal is transmitted in packeted and/or compressed form. Preferably, a second channel-control device is placed between the receiving device and the decompression device and is intended to reconstruct the audio reception signal when the possibly data-packed audio reception signal is received on more than one transfer channel.

The transmission and/or reception device is designed for connection to an antenna, by means of which the compressed audio transmission signal and/or the audio reception signal are transmitted or received, respectively, on the transfer channel or channels. Preferably, the device itself is equipped with the antenna, in order to ensure an especially high degree of independence of the transmission and/or reception operation.

Preferably, the device displays an A/D converter, which at a minimum is placed between the first means for obtaining the audio input signal and the first mixing device. The device according to the invention further displays a D/A converter, which is placed between the second mixing device and the means for reproducing the audio output signal. The A/D converter is intended for providing a digital audio input signal, and the D/A converter for providing an analog audio output signal. The device displays an output port for a digital outputting of the audio signals. Especially preferred is a form of embodiment according to which the output port has a sampling-rate converter for converting the bit rate of the audio signals. A still further improved form of embodiment displays means for dynamically adapting the bit rate of the audio signals, that is to say the data rate. With the dynamic adapting, an especially high degree of flexibility is achieved with respect to the connection of a digital reproduction apparatus to the output port.

In another form of embodiment of the invention, the device displays signal-level limiting device for controlling the level of the audio input signal, which limiting device is placed between the means for obtaining the audio input signal and the first mixing device. The signal-level limiting device serves in particular to avoid an overmodulation of an obtained audio input signal. The device further displays a volume-control device for controlling the level of the audio output signal, which control device is placed between the mixing device and the means for reproducing the audio output signal. The volume-control device makes possible a control of the volume of the audio output signal.

The control device for controlling the first mixing device displays a program and/or data memory, an image-viewing apparatus, an input device, and preferably an interface to a computer and/or a computer network. In this form of embodiment of the invention, there exists the possibility of integrating the device completely into an interactive computer-media network. Preferably, the device also displays a mass storage for storing away the audio signals. The mass storage is controllable by the control device. In a further form of embodiment of the invention, the control device indicates on the image-viewing apparatus the signal level of the audio signal. In one form of embodiment of the invention, the control device is intended to control the second mixing device.

Especially preferred is a form of embodiment in which the entire device or at least a part of the device is sealed against water spray and/or is designed to be received in a small case. In this form of embodiment, the device according to the invention is transportable and is impervious to influences of weather such as rain, humidity, or strong solar radiation.

The mobile device, in an especially compact form of embodiment, is mountable on a camera or is firmly attached to the camera. This mobile device is suitable for transferring image data that is captured by the camera.

In an especially preferred form of embodiment, the mobile device is integrated into an acoustic monitoring system and programmed in such a manner that the device automatically establishes contact with a base station when the monitoring system registers a predetermined event. When the contact with the base station is set up, the mobile device transfers audio signals picked up in its surrounding area. The mobile device is also suited to reproducing and transferring audio signals that were picked up, for example, immediately prior to the occurrence of the predetermined event and whose associated audio data were stored in the mass storage.

Both and mobile elements and the base stations have individual telephone numbers and are thus accessible straightforwardly and selectively from any telephone line whatever. This is especially advantageous in the context of software updates. The carrying out of the latter can take place from a central location, for example directly from the producer, according to the wishes of the operator. Considering all of the devices in operation, this will lead to the fact that in the course of time uniform software standards will no longer be present and in use. In particular upon changes in the audio-compression processes, this can lead to incompatibilities, since in principle each mobile element must be able to work together with each base station, no matter where the latter is located.

According to the invention, this problem can be solved by the fact that provision is made for a data bank for storing of audio-compression algorithms and for a selection device, coupled to the compression and/or decompression device, for selecting a compression or decompression algorithm suitable for the transmitting of an audio transmission signal and/or the receiving of and audio reception signal. With this embodiment, which incidentally also forms an independent inventive concept, the possible audio-compression algorithms are accordingly pre-loaded in the base stations and/or the mobile elements in the form of a data bank. Then, when contact is established, the devices involved settle on the best commonly available process.

The GSM standard, like other mobile phone standards, allows no monitoring of the field strength while the data are being transferred. For this reason, no information is available concerning how secure the transfer actually is.

Thus, in a further preferred embodiment, which alternatively also forms an independent inventive concept, provision is made for monitoring the field strength of the transmitted audio transmission signal and/or the received audio reception signal.

In a further development of this embodiment, a specific quality criterion is created on the basis of the continuous data stream by having the error-monitoring device on the transmitter end provide the audio transmission signal with additional information, and on the receiver end evaluate the errors occurring in the transfer of this information and draw up corresponding error information. In this way, an evaluation of the number of errors occurring is possible on the receiver end. To achieve the purpose, the data stream should be provided with additional information that enables an evaluation on the receiver end of the number of bit-errors occurring. Possibilities here are, for example, methods such as checksum formation, Reed-Solomon coding, or the like.

As was already touched upon above, advantageously several transfer channels should be used in order to have a sufficient channel capacity available; in this, preferably all of the channels have the same importance. However, it has been shown that, even when the antennas of the transmitter and/or receiver device are arranged so that they neighbor each other relatively closely, a clear difference with respect to the security of the transfer can be observed in the transfer channels. Beyond this, the quality over time in all of the transfer channels fluctuates independently of each other, in particular when the mobile element concerned is in motion. One transfer channel whose transfer quality was just now still quite good, suddenly goes bad, and the transfer quality of another channel suddenly becomes dearly better. In extreme cases, contact can even be completely broken, which causes a collapse of the entire transfer.

In order to solve or at least mitigate this problem, it is proposed that the compression and/or decompression device compress the audio transmission signal by means of an audio-compression algorithm that consists of a basic layer and at least one enhancement layer, which layers are transferred in at least one transfer channel; in this, the first channel-control device appropriately assigns to each transfer channel the data of one layer, so that in each case the data of the layer are transferred in one transfer channel. Accordingly, in this embodiment, which incidentally also represents an independent inventive concept, an audio-compression algorithm is first selected, which algorithm consists of a so-called base layer and at least one additional so-called "enhancement layer". These algorithms are formed by a suitable combination of physio-acoustic and predictive coding strategies, such as, for example, CELP and AAC processes. In this, the data streams of the respective layers are, as mentioned, to be chosen so that they can be transferred in a single mobile-radio channel. On the receiver end, the base layer is always necessary in order to decode an audio reception signal. The more enhancement layers are transferred, the better the audio quality of the decoded audio reception signal is.

In a further development of the embodiment described above, the first channel-control device, depending on the error information obtained from the error-monitoring device, selects the transfer channels in such a manner that the base layer is transferred on the transfer channel with the best quality, and preferably, in the case of several enhancement layers, the first enhancement layer is transferred on the transfer channel with the second-best quality, while the remaining enhancement layers are transferred according to their order on a transfer channel with the next-best quality in each case. Accordingly, with this further development a prioritization of the channels on the basis of quality can be carried out, which is obviously only possible when the error information is sent back from the error-monitoring device to the transmitter. Thus, over the best channel the base layer is transferred, over the second-best the first enhancement layer, and so on. Such a measure is especially advantageous when the assignation of the layers to the transfer channels is changed or adapted depending on the momentary situation. On the receiver end one is then able, even in the case of large errors, and particularly at high bit-error rates or when some of the channels have dropped out completely, to at least carry out a decoding of the audio signal via the base layer. The quality changes with the number of data channels available, but in general, with this embodiment even in very unfavorable transfer conditions it is still possible to establish contact.

At this point, for the sake of completeness it should be mentioned that the term "audio signal" used here also stands for data signals of all types, thus for signals that, in addition to an audio portion, also contain other data or if necessary can also consist exclusively of other types of data.

Figure 2:
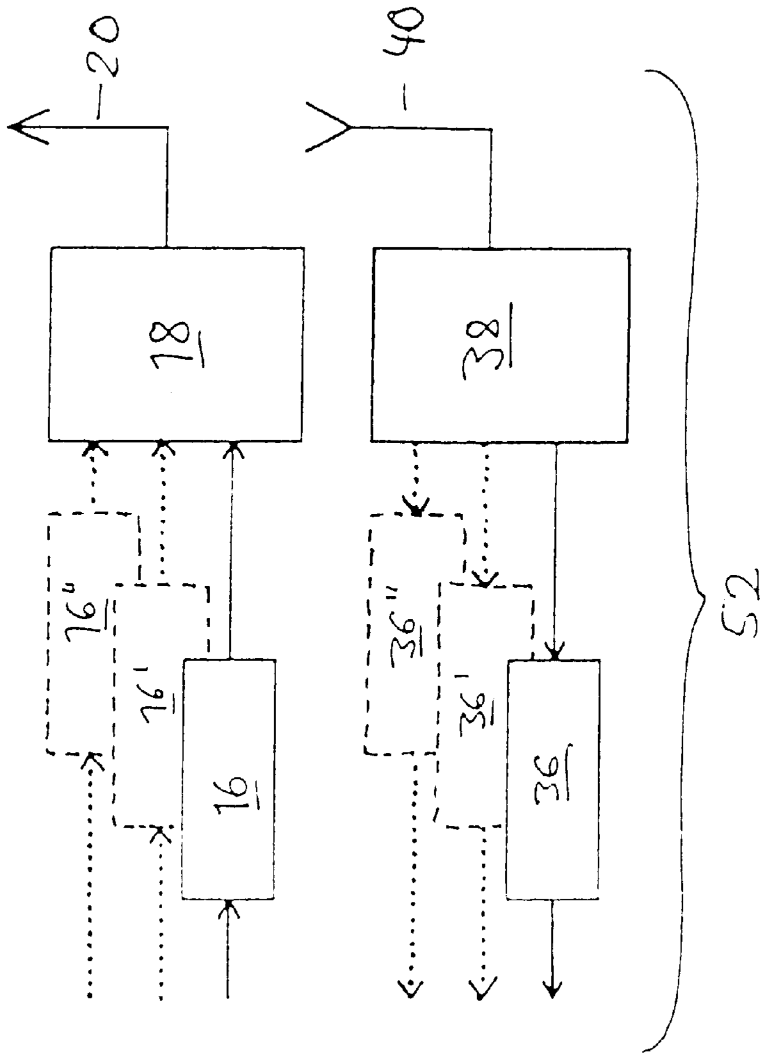
Figure 3:
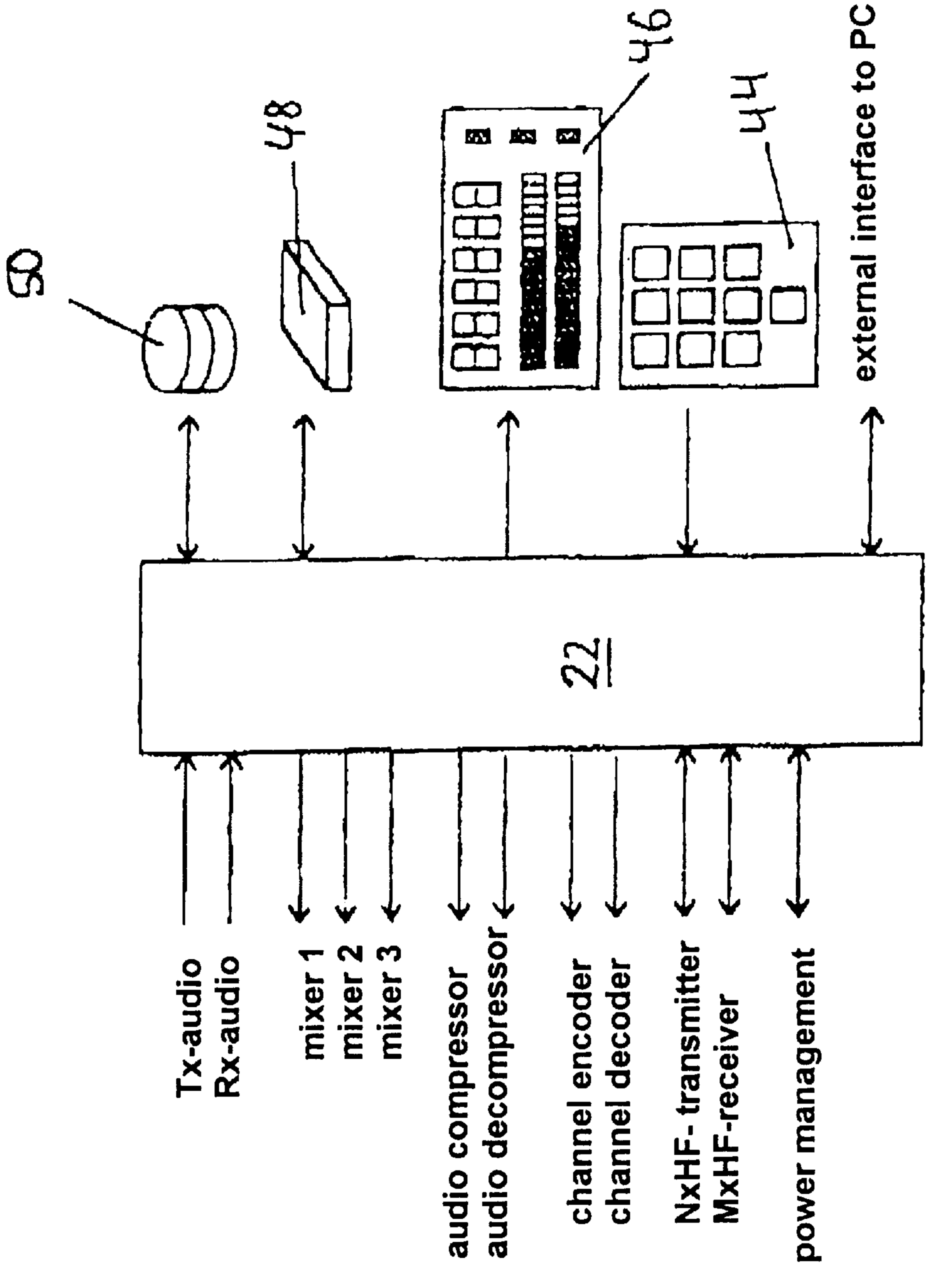
Figure 4:
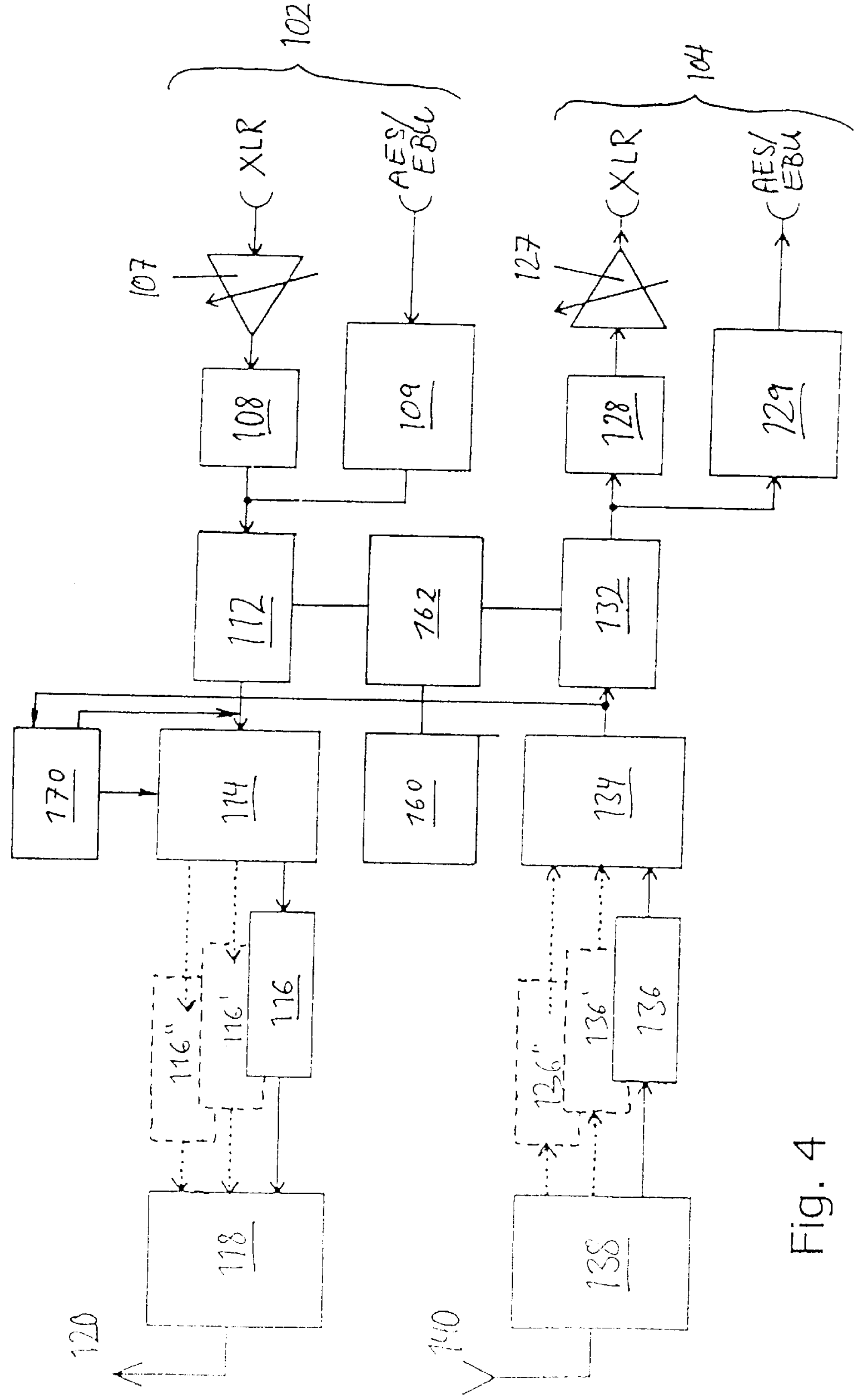
Figure 5:
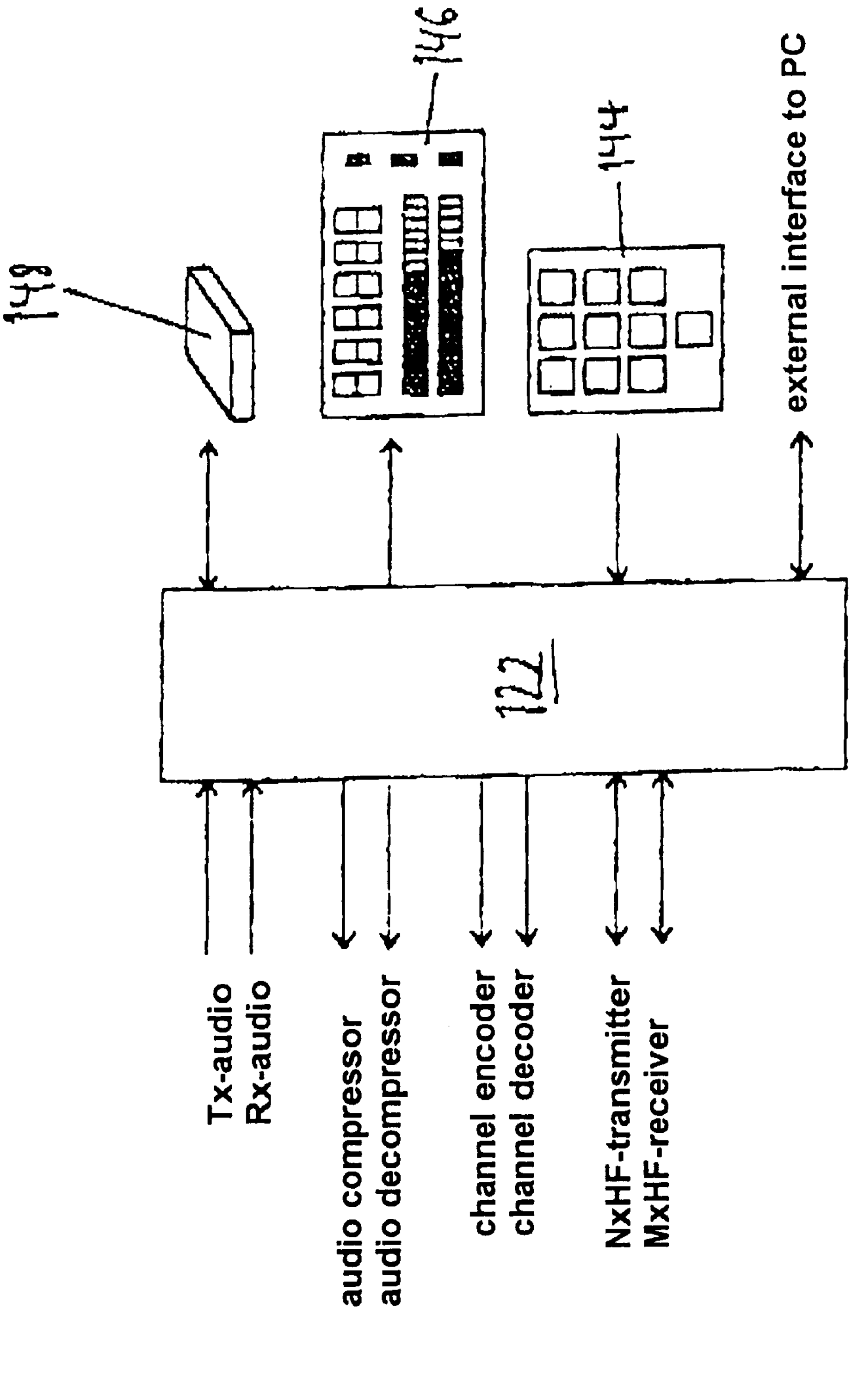

In the following, an example of embodiment of the invention is explained in further detail with the aid of the drawings. They show:

FIG. 1: a block circuit diagram of a encoder/decoder unit of the device according to the invention FIG. 2: a block circuit diagram of a high-frequency transfer unit of the device according to the invention FIG. 3: a block circuit diagram of a control unit of the device according to the invention FIG. 4: a block circuit diagram of a high-frequency transfer unit with an encoder/decoder unit of a base station FIG. 5: a block circuit diagram of a control unit of the base station Represented in FIGS. 1 and 2 is a device according to the invention for bidirectional transfer of audio signals in the context of sound reports. The device is designed to be mobile and displays a first section 2 for picking up and transmitting audio signals, as well as a second section 4 for receiving and reproducing audio signals. The first section 2 and the second section 4 are connected to each other.

The first section 2 displays a microphone 6, an acoustic level control (ALC) 7, an A/D converter 8, a first mixing device 10, a compression device 12 and a channel-control device 14, as well as several high-frequency transmitters 16, 16', and 16" and a transmitter switch 18 with transmitter antenna 20 (see FIG. 2).

The microphone 6 is connected to the acoustic-level control 7, which in turn is connected to the A/D converter 8. The output of the A/D converter 8 is connected to the input of the first mixing device 10. The compression device 12 is connected to the output of the first mixing device 10. The channel-control device 14 is connected to the compression device 12 and the outputs of the channel-control device 14 are connected to the high frequency transmitters 16, 16', 16", which in turn are connected to the inputs of the transmitter switch 18. With the high frequency transmitters 16, 16', 16" it is a matter of devices that are designed for transmitting in a mobile-radio network, in particular a GSM network.

The device further displays a control device 22 for controlling the first mixing device 10. The input of the control device 22 is connected to the output of the first mixing device 10; the output of the control device 22 is connected input of the first mixing device 10.

The second section 4 displays two pairs of headphones 26, 26', two volume controls 27, 27', two D/A converters 28, 28', a second and a third mixing device 30, 30', a decompression device 32, a channel-deciphering device 34 (see FIG. 1), as well as several high frequency receivers 36, 36', 36" and a receiver switch 38 with reception antenna 40 (see FIG. 2).

The reception antenna 40 is connected to the input of the receiver switch 38. The high frequency receivers 36, 36', 36" are designed to receive signals from a mobile-radio network, in particular a GSM network, are in each case connected to an output of the receiver switch 38, and are coupled at their output to an input of the channel-deciphering device 34, which in turn is connected to the decompression device 32. The output of the decompression device 32 is connected to an input of each of the second and third mixing devices 30, 30'. The outputs of the second and third mixing devices 30, 30' are connected to the D/A converters 28, 28', respectively, and the pairs of headphones 26, 26' are connected to the outputs of the D/A converters 28, 28', respectively, via the volume controls 27, 27'.

The output of the decompression device 32 is further connected to an input of the first mixing device 10. The output of the first mixing device 10 is connected in each case to an input of the second and third mixing devices 30, 30'.

Provision is further made for a data bank 60 for storing audio-compression and decompression algorithms, which data bank is coupled to a selector device 62. The selector device 62 is further connected to the compression device 12 and to the decompression device 32.

Finally, provision is also made for a error-monitoring device 70, which on one side is coupled to the path between the compression device 12 and the channel-control device 14, and on the other side to the path between the channel-deciphering device 34 and the decompression device 32, and is further connected to the channel-control device 14.

In the following, the manner of functioning of the device represented in FIGS. 1 and 2 shall be explained. The section of the device represented in FIG. 1 serves as the encoder/decoder unit for processing audio data. The audio data are obtained by picking up an acoustic signal with the microphone 6 and sending it as an audio input signal via the acoustic-level control (ALC) 7 to the A/D converter 8. The A/D converter 8 converts the audio input signal and outputs it as a digital audio input signal, i.e. as a data signal with the audio data, to the first mixing device 10. The data signal contains the audio data as well as, if necessary, further relevant data.

In the first mixing device 10, a transmission signal is formed from the data signal as well as, if applicable, further data signals output by the control device 22 or the decompression device 32, as the case may be; to form this, the data signals are mixed or multiplexed. The data signals can be mixed by the operator in the first mixing device 10 in any ratio whatever to each other, in order to form the transmission signal. The mixing device 10 outputs the transmission signal to the compression device 12, the control device 22, as well as the second and third mixing devices 30, 30'. In the compression device 12, the transmission signal is compressed in real time according to a selectable compression algorithm. The algorithm and the compression rate are chosen in consideration of the circumstances present for the transmission of the transmission signal, for example the number of available transfer channels and their respective transfer rates, and are adapted to these circumstances. For this purpose, the selector device 62 chooses a suitable compression algorithm from the data bank 60. The algorithms that are stored in the data bank 60 and are to be chosen by the selector device 62 consist in each case, for reasons to be explained below, of a so-called "base layer" and additional so-called "enhancement layers". Such algorithms are formed from a combination of physio-acoustic and predictive coding strategies, as for example CELP and AAC processes. The control of the compression device 12 can be predetermined by means of a program or can be undertaken on an individual basis by the operator.

The compression device 12 outputs a compressed transmission signal to the channel-control device 14. In the process, the error-monitoring device 70 provides the data stream of the compressed transmission signal with additional information that makes possible an evaluation at the receiver end of the number of bit errors that arise. Possibilities here include processes such as checksum formation, Reed-Solomon encoding, or the like. The compressed transmission signal is distributed into packets by the channel-control device 14. The individual packets are provided with a structure and error protection. The packeting is undertaken in such a manner that the packets received by the receiver can be joined together to form a reception signal that corresponds to the transmission signal, whereby transfer errors possibly arising are corrected or are disguisable. The packets are presented by the channel-control device 14 to the high frequency transmitters 16, 16', 16" according to their quantity and the capacity of available channels; the high frequency transmitters, in turn, lead further to the transmitter switch 18. By means of the transmitter antenna 20 of the transmitter switch 18, the packets are finally transmitted.

As made clear in FIG. 1, in the represented example of embodiment three channels are used in parallel. In this way, a sufficient channel capacity is made available. Each of the channels has the same importance. In particular when, instead of the transmitter switch 18 and single transmitter antenna 20 shown in FIG. 2, a multiplicity of transmitter antennas is used, corresponding to the number of channels utilized, it has proven the case that even if the antennas are arranged so as to relatively closely neighbor each other, a clear difference with respect to the transfer security exists with the parallel channels. Beyond that, the quality fluctuates over time independently in each of the channels, in particular when the mobile device is in motion. One channel, which just know still had a good transfer quality, suddenly worsens, and the transfer quality of another channel suddenly improves greatly. Now, when with the aid of the selector device 62 a compression algorithm is chosen, consisting of a base layer and additional enhancement layers, the data streams of the respective layers are to be so chosen that each can be transferred in a single, correspondingly assigned channel. Namely, the base layer is always needed on the receiver end in order to decode the audio signal. The more enhancement layers are transferred, the better is the audio quality of the decoded signal. Now, using the error evaluation made in the error-monitoring device 70, it is possible to carry out a prioritization of the channels on the basis of quality. For this purpose, the channel-control device 14, depending on the error information obtained by the error-monitoring device 70, selects the channels in such a way that the base layer is transferred on the channel with the best transfer quality, the first enhancement layer on the channel with the second-best quality, and the further enhancement layers, corresponding to their order, on transfer channels with the next-best quality in each case. This measure is especially advantageous when the assignation of the layers to the channels is dynamically changed or rather adjusted according to the momentary situation. On the receiver side (section 4) i is then possible, even in the case of high bit-error rates in the channels with poorer transfer quality, to carry out a decoding of the audio signal at least via the base layer.

When the reception antenna 40 of the reception switch 38 receives a data signal, possibly on several channels, this is then fed to the high frequency receivers 36, 36', 36" according to the reception channel. The high frequency receivers 36, 36', 36" further conduct the data signal received in each case to the channel-deciphering device 34. The channel-deciphering device 34 frees, if need be, the incoming data signals from a channel encoding and assembles detected signal packets in such a manner that from this a compressed reception signal results. In addition, derived from these data signals is error information, which is constructed at the receiver end through a suitable evaluation of the additional information transmitted by the error-monitoring device 70, and is transferred back to section 4. This error information, which preferably is a matter of bit-error information, is again input to the error-monitoring device 70, so that the channel-control device 14 selects the channels in the previously described manner depending on this error information.

The channel-deciphering device 34 is controllable by the control device 22. The control device 22, if need be, undertakes the control according to a program received with the reception signal. In this, the control device 22 also takes into consideration operating guidelines and/or control information transferred by means of the reception signal. A deciphered reception signal is presented to the decompression device 32 by the channel-deciphering device 34. The decompression device 32 decompresses the deciphered reception signal by using a decompression algorithm that is selected to correspond with the compression algorithm used in the compression of the original signal.

The decompressed reception signal output by the decompression device 32 is further conducted to an input of each of the first 10, second 30, and third 30' mixing devices. From the second and third mixing devices, 30 and 30' respectively, a digital mixed signal is passed, in each case, on to the D/A converters, 28 and 28' respectively, each of which makes available at its output an analog mixed signal. The amplitude of these analog mixed signals is controlled by means of the volume controls, 27 and 27' respectively, connected to the D/A converters 28, and each signal is conducted to an output, 26 and 26' respectively, which converts it into an acoustic signal and makes it audible.

For example, according to the above-described form of embodiment of the invention, a mixed signal put together by the second mixing device is mixed to meet the concerns of a reporter who uses the device and wears the first set of headphones 26. The third mixing device 30' assembles a mixed signal so that it is suitable for an interview partner who wears the second set of headphones 26'. In particular, the mixed signal that is put together for the reporter is distinguished from the mixed signal assembled for the interview partner by the fact that the reception signal sent out by the base station and received by means of the reception antenna 40 is, according to requirement, only added to the mixed signal for the reporter.

The control device 22 represented in FIG. 3 forms an interface for operating the device according to the invention and, to the extent that an appropriate programming of the control device 22 is undertaken, controls components of the device that are connected to the control device 22.

The control device 22 is connected to a keypad or operating panel 44, by means of which the control device 22 can be operated manually. The keypad 44 displays large keys and additional sturdy operating elements. Connected to the control device 22 is a display 46. In addition, connected to the control device 22 are a first storage device 48 for storing programs and/or data and a second storage device 50, formed as a mass storage unit.

The display 46 serves to graphically represent (audio) signal levels. The audio signals are fed by the control device 22 to the display 46 and the levels of the signals to be sent or the signals received are shown on the display 46 in a bar graphic. On the display 46, the control device 22 displays information concerning the operating state of the device. Applicable as means of indication are alphanumeric information, bar graphs, status indicators, as well as text; in particular, the means of indication serve an interaction with the user, as for example to prompt an input on the keypad 44.

Stored in the first storage device 48 are several programs that serve a selectable execution of different compression algorithms. The selection of the compression algorithm is undertaken by the control device 22, if need be by means of a manual input on the keypad 44, in consideration of the amount of the audio data to be transferred, the transfer channels available, as well as the transfer time period planned for the transfer and the quality to be attained in the transferred signal.

The control device 22 displays signal inputs (Tx audio, Rx audio) for audio signals to be transferred or received, as the case may be. Formed on the control device 22 are outputs (Mixer 1, Mixer 2, Mixer 3) for transferring signals to the first 10, second 30, and third 30' mixing devices, respectively. Further formed on the control device 22 are outputs (audio compressor, audio decompressor) for outputting signals to the compression device 12 and decompression device 32, respectively. The control device 22 in addition displays outputs (channel encoder, channel decoder) to which the channel-control device 14 and channel-deciphering device 34, respectively, are connected. Furthermore, connected to the control device are a number N of transmission-channel control lines (N×HF-transmitter) as well as a number M of reception-channel control lines (M×HF-receiver) to the high-frequency transmitters 16, 16', 16" and to the high-frequency receivers 36, 36', 36", respectively. Finally, the control device 22 displays a lead (Power Management) designed for bidirectional signal transfer, by which the energy supply of the device can be controlled. The control device 22 is linked to an external PC interface through a bidirectional lead.

The control device 22 optimizes the transfer of the audio signals by controlling the channel-control device 14, which puts the audio signal into packets and, for the transfer, passes on the packets to the high-frequency transmitters 16, 16', 16" through one or several transmission channels.

The channel-deciphering device 34 is controlled by the control device 22 in such a manner that the data packets received by the high-frequency receivers 36, 36', 36" are assembled to form a data signal. By means of the keypad 44, predefined functions as well as settings of the channel-deciphering device 34 can be recalled. Furthermore, a designated base station can be selected for the reception of the data to be transferred. The control device 22 is additionally designed to undertake an automatic tying-together of stored information about introduction, credits, transmitter identification, and/or reporter identification, concerning, for example, a user who discloses his or her identity by an input on the keypad 44, and to produce selection or dialing identification for the base station designated for the reception of the data to be transferred.

The first storage device 48 contains an operating program. The first storage device 48 is designed as a flash memory. The operating system and/or program stored in the flash memory can be changed, among other ways, by the reception of appropriate data signals by means of the high-frequency receivers 36, 36', 36", the subsequent reception, assembly, and decompression of these signals by the channel-deciphering device 34 and the decompression device 32, and finally the conducting of the signal to the control device 22. Any base station can transfer the data signal, which contains a program and/or operating system, by means of a dialing up of the device.

The second storage device 50 is designed as a mass storage unit and is received in a socket location on the control device 22, which location is designed for taking up mass storage units that can be optionally used. The second storage device 50 is designed as a PCMCIA mechanism or—in an alternative form of embodiment—as a memory card. The second storage device 50 is exchangeable. The second storage device 50 serves to record audio signals or data signals that contain a report, and information that is intended for playback by the device. The second storage device 50 serves, for example, to record configuration data and audio signals that are intended as introductions, credits, transmitter identification, reporter identification, etc.

The device is designed for configuration by means of a PC. The PC can be connected to an extemal PC interface. The PC delivers to the control device configuration data, a telephone-number library, audio data, assignation data, which specifies a tying-together of audio data with telephone numbers, and similar data. The PC enables the user to easily assemble and draw up the data intended for delivery to the control device 22.

The control device 22 is arranged in a portable housing (not represented), in which is further accommodated the first section 2 for taking up and transferring audio signals, with the exception of the microphone 6, and the second section 4 for receiving and reproducing audio signal in the headphones 26, 26'. The housing is designed to be especially sturdy and displays a shoulder strap. The components of the device according to the invention are arranged in the housing and protected against spray water and other impurities. The dimensions of the housing are chosen so that the housing and the accessory elements, such as, for example, a spare storage battery for power, the microphone 6, the headphones 26, 26', as well as possible additional accessory elements, can also be accommodated in an attache case.

Represented in FIGS. 4 and 5 are linked components of a base station, which is intended for communication with the device according to the invention. The base station is arranged, for example, in a broadcasting center, studio, home office or private studio, or an outside broadcast van. The base station displays a first section 102 for transmitting audio signals and relevant data signals, as for example program commands, and a second section 104 for receiving audio signals.

The first section 102 and the second section 104 display in each case an analog jack (XLR) and a digital jack (AES/EBU). The analog jack of the first section 102 is connected to an acoustic-level control (APC) 107, which is connected to an A/D converter 108. The digital jack (AES/EBU) is connected to an interface 109 with a scan-rate converter. The output of the A/D converter 108 and the output of the interface 109 are connected to a compression device 112, which in turn is connected to a channel-control device 114. Connected to the channel-control device 114 are several high-frequency transmitters 116, 116', 116", whose outputs are connected to a transmitter switch 118, which displays a transmitter antenna 120.

In the second section 104, the base station displays a receiver switch 138 provided with a receiver antenna 140, to which switch are connected several high-frequency receivers 136, 136', 136", which for their part are linked to a channel-deciphering device 134. Connected to the outputs of the channel-deciphering device 134 is a decompression device 132, which, via a D/A converter 128 and a volume control 127, is linked to the connection jack (XLR). Further, the output of the decompression device 132 is connected to the connection jack (AES/EBU) via an interface 129 containing a scan-rate converter.

Provision is further made in the base station according to FIG. 4 for a data bank 162 for storing audio-compression algorithms and for a selector device 162 connected with the latter, which selector device is in turn connected to both the compression device 112 and the decompression device 132. The contents of the data bank 160 of the base station according to FIG. 4 should be the same as those of the data bank 60 of the mobile device according to FIG. 1.

In addition, contained in the base station is an error-monitoring device 170, which is connected, on the one hand, to the signal path between the compression device 112 and the channel-control device 114, and on the other hand to the signal path between the channel-deciphering device 134 and the decompression device 132. The error-monitoring device is further connected to the channel-control device 114. The error-monitoring device 170 of the base station according to FIG. 4 operates in the same manner as the error-monitoring device 70 of the mobile device according to FIG. 1 and, together with the latter, forms an error-monitoring system, in which the one error-monitoring device appropriately evaluates the information originating in the other error-monitoring device and sends back again error information generated by this analysis.

The base station displays a control device 122, which is represented in FIG. 5. The control device 122 is connected to a program/data memory 148 in a bidirectional manner and in addition has bidirectional connection capabilities (N×HF-transmitter, M×HF-receiver, external interface to PC) for a number N of high-frequency transmitters as well as a number M of high-frequency receivers and furthermore for an external PC interface. Formed on the control device 122 are inputs (Tx-Audio and Rx-Audio) for receiving a transmission signal or reception signal, respectively. In addition, the control device 122 displays outputs (Audio Compressor, Audio Decompressor, Channel Encoder, Channel Decoder) for connection to the compression device 112, the decompression device 132, the channel-control device 114, as well as the channel-deciphering device 134. By means of a keypad 144, which is connected to the control device 122, the control device 122 can be operated by a user. Furthermore, a display 146 for representing, in particular, signal levels, is attached to the control device 122.

The components of the base station represented in FIGS. 4 and 5 function in an analogous manner to the corresponding components of the example of embodiment of the invention described in connection with FIGS. 1 through 3, according to which the device is designed so as to be mobile. The base station is intended for transmitting and receiving signals to and from the mobile device. The base station displays the components that are suitable for the communication as well as for an incorporation of the base station into a complete system, such as, for example, a computer-aided studio system. These are the digital connection jacks in the AES/EBU format with the interfaces 109, 129 containing the scan-rate converter, and the functions of storing and managing a telephone-number library, in particular with the numbers of mobile devices, in the program/data memory 148, of selecting and configuring one of the interfaces 109, 129, and of transferring program data to one or several mobile devices according to pre-existing instructions or upon request.

The mobile device detailed in the example of embodiment, and, if applicable, the assigned based station are not restricted to the use of a particular mobile-phone network. The high-frequency transmitters 16, 16', 16", 116, 116', 116" as well as the high-frequency receivers 36, 36', 36", 136, 136', 136" as well as additional components as required are exchangeable and/or modifiable in order to make possible an adaptation to different mobile-phone networks.

Further, in this connection let i also be remarked that it is not always absolutely necessary to provide the base station shown in FIG. 4 with an HF-transmitter capability, as realized through the components 116, 116', 116", and 118 according to the example of embodiment shown in FIG. 4. Rather, it is also conceivable that the base station delivers its signals to a fixed network, e.g. an ISDN network, without their having undergone the above-described function. In this case, instead of the components 116, 116', 116", and 118, as they are shown in FIG. 4, provision is made for a terminal for connection to the fixed network.

What is claimed is:

1. A device for bidirectional transfer of audio and/or video signals, comprising:

one or more means for providing an audio input signal;

a first mixing device connected to said means for providing an audio input signal, said first mixing device outputting a mixed audio transmission signal;

a transmission-reception device coupled to said first mixing device, said transmission-reception device for transmitting said mixed audio transmission signal and/or for receiving an audio reception signal;

a control device coupled to said first mixing device, said control device for controlling said first mixing device;

a second mixing device;

a compression-decompression device connected to said first mixing device, said second mixing device, and said transmission-reception device;

said compression-decompression device for taking up said mixed audio transmission signal and compressing said mixed audio transmission signal, and/or for decompressing and delivering said audio reception signal;

said transmission-reception device for delivering said compressed audio transmission signal or taking up said audio reception signal;

one or more means connected to said second mixing device for reproducing said decompressed audio reception signal; and means for providing one or more mobile radio and/or mobile telephone network channels as a transfer channel.

2. The device for bidirectional transfer of audio and/or video signals according to claim 1, wherein said transmission-reception device transmits said compressed audio transmission signal or said audio reception signal over two or more transfer channels.

3. The device for bidirectional transfer of audio and/or video signals according to claim 1, further comprising a first channel control device connected to said compression-decompression device and said transmission reception device, said first channel control device for dialing up one or more transfer channels, for putting said compressed audio transmission signal into packets, and for distributing said packets among said transfer channels.

4. The device for bidirectional transfer of audio and/or video signals according to claim 3, further comprising a second channel control device connected to said compression-decompression device and said transmission-reception device, said second channel control device for reconstructing said audio reception signal when said audio reception signal is received on more than one transfer channel.

5. The device for bidirectional transfer of audio and/or video signals according to claim 1, wherein said transmitter-reception device further comprises a transmitter section, said transmitter section connected to an antenna, for transmitting sections of said audio transmission signals over said transfer channels;

and further wherein said transmitter-reception device comprises a receiver section, said receiver section connected to an antenna, for receiving, said audio reception signals over said transfer channels.

6. The device for bidirectional transfer of audio and/or video signals according to claim 1, further comprising:

an A/D converter coupled to said means for providing an audio input signal and said first mixing device; and a D/A converter coupled to said means for reproducing an audio output signal and said second mixing device.

7. The device for bidirectional transfer of audio and/or video signals according to claim 6, further comprising:

an output port for digital outputting of said audio signal; and a scan rate converter for converting a bit rate of said audio signal.

8. The device for bidirectional transfer of audio and/or video signals according to claim 7, further comprising means for dynamically adapting said bit rate of said audio signal.

9. The device for bidirectional transfer of audio and/or video signals according to claim 1, further comprising a signal level limiting device coupled to said means for providing said audio input signal and said first mixing device, said signal level limiting device for controlling the level of said audio input signal.

10. The device for bidirectional transfer of audio and/or video signals according to claim 1, further comprising a volume control device coupled to said means for reproducing said audio output signal and said second mixing means, said volume control device controlling the level of said output signal.

11. The device for bidirectional transfer of audio and/or video signals according to claim 1, wherein said control device further comprises:

a program and data memory;

a display apparatus;

an input device; and an interface to a processing unit.

12. The device for bidirectional transfer of audio and/or video signals according to claim 11, wherein said control device further comprises a mass storage unit.

13. The device for bidirectional transfer of audio and/or video signals according to claim 12, wherein said control device displays the signal level of said audio signals on said display apparatus.

14. The device for bidirectional transfer of audio and/or video signals according to claim 1, wherein said device is sealed so as to prevent damage by moisture.

15. The device for bidirectional transfer of audio and/or video signals according to claim 1, further comprising:

a selector device connected to said compression and said decompression device; and a data bank connected to said selector device;

wherein said data bank stores audio-compression and audio-decompression algorithms;

and further wherein said selector device is for selecting a decompression algorithm for transmitting said audio transmission signal or receiving said audio reception signal.

16. The device for bidirectional transfer of audio and/or video signals according to claim 1, further comprising an error monitoring device for monitoring a field strength of said transmitted audio signal or said received audio reception signal.

17. The device for bidirectional transfer of audio and/or video signals according to claim 16, wherein said error monitoring device provides said transmitted audio transmission signal with information;

and further wherein said error monitoring device evaluates errors occurring in the transfer of said information;

and further wherein said error monitoring device produces error information.

18. The device for bidirectional transfer of audio and/or video signals according to claim 17, wherein said error monitoring device provides said transmitted audio transmission signal with information regarding the number of bit errors.

19. The device for bidirectional transfer of audio and/or video signals according to claim 1, wherein said compression-decompression device further comprises an audio compression algorithm;

and further wherein said audio compression algorithm comprises a base layer and one or more enhancement layers;

and further wherein said base layer and said enhancement layers are transferred on said one or more transfer channels.

20. The device for bidirectional transfer of audio and/or video signals according to claim 19, wherein said first channel control device assigns data from said base layer or said enhancement layers to one of said transfer channels, so that data from said base layer or one of said enhancement layers is transferred on one of said transfer channels.

21. The device for bidirectional transfer of audio and/or video signals according to claim 19, wherein said error monitoring device provides error information to said first channel control device;

and wherein said first channel control device selects a first transfer channel with the best quality for transmission of said base layer;

and further wherein said first channel control device selects a second transfer channel with the second best quality for transmission of a first enhancement layer;

and further wherein said first channel control device selects a third transfer channel with the third best quality for transmission of a second enhancement layer;

and further wherein said first channel control device selects subsequent transfer channels for transmission of subsequent enhancement layers based upon the quality of said subsequent transfer channels.

22. A device for bidirectional transfer of audio and/or video signals, comprising:

one or more means for providing an audio input signal;

a first mixing device connected to said means for providing an audio input signal, said first mixing device outputting a mixed audio transmission signal;

a transmission-reception device coupled to said first mixing device, said transmission-reception device for transmitting said mixed audio transmission signal and/or for receiving an audio reception signal;

a control device coupled to said first mixing device, said control device for controlling said first mixing device;

a second mixing device;

a compression-decompression device connected to said first mixing device, said second mixing device, and said transmission-reception device;

said compression-decompression device for taking up said mixed audio transmission signal and compressing said mixed audio transmission signal, and/or for decompressing and delivering said audio reception signal;

said transmission-reception device for delivering said compressed audio transmission signal or taking up said audio reception signal;

one or more means connected to said second mixing device for reproducing said decompressed audio reception signal; and means for providing one or more mobile radio and/or mobile telephone network channels as a transfer channel;

wherein said transmission-reception device transmits said compressed audio transmission signal or said audio reception signal over two or more transfer channels;

and wherein the number and/or type of transfer channels intended for transmission differs from the number and/or type of transfer channels intended for reception;

and further wherein said difference is dependent on said compressed audio transmission signal and said audio reception signal.

* * * * *